United States Patent
Lee et al.

(10) Patent No.: US 6,572,673 B2
(45) Date of Patent: Jun. 3, 2003

(54) PROCESS FOR PREPARING NOBLE METAL NANOPARTICLES

(75) Inventors: Chien-Liang Lee, Hsinchu (TW); Chi-Chao Wan, Hsinchu (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 39 days.

(21) Appl. No.: 09/876,093

(22) Filed: Jun. 8, 2001

(65) Prior Publication Data

US 2002/0194958 A1 Dec. 26, 2002

(51) Int. Cl.⁷ .................................................. B22F 9/24
(52) U.S. Cl. ............................ 75/362; 75/370; 75/371
(58) Field of Search ........................ 75/343, 362, 369, 75/370, 371

(56) References Cited

U.S. PATENT DOCUMENTS

| | | | |
|---|---|---|---|
| 5,188,660 A | * 2/1993 | Tosun et al. | 75/370 |
| 5,250,101 A | * 10/1993 | Hidaka et al. | 75/362 |
| 5,759,230 A | * 6/1998 | Chow et al. | 75/362 |
| 5,984,997 A | * 11/1999 | Bickmore et al. | 75/343 |
| 6,447,571 B1 | * 9/2002 | Ito et al. | 75/369 |

* cited by examiner

*Primary Examiner*—George Wyszomierski
(74) *Attorney, Agent, or Firm*—Bacon & Thomas

(57) ABSTRACT

A process for preparing metal nanoparticles, comprising reacting suitable metal salts and anionic surfactant containing an anionic group of carboxylic group ($COO^-$), sulfate group ($SO_4^{2-}$) or sulfonate group ($SO_3^{2-}$) as reducing agent in water under reflux at a temperature of 50–140° C., such that under the reducing power of said anionic surfactant itself, the metal salts can be effectively reduced into metal nanoparticles having a uniform particle size and that the reaction will be not too fast, no large microparticle will be formed, the yield will not be lowered, and the nanoparticle thus prepared can be dispersed stably in polar and non-polar solvent.

16 Claims, 2 Drawing Sheets

PROCESS FOR PREPARING NOBLE METAL NANOPARTICLES

BACKGROUND OF THE INVENTION

1. Field of the Invention

The invention relates to a process for preparing noble metal nanoparticles by reducing metal nanoparticles and controlling their particle size with surfactant, characterized in that the nanoparticles thus prepared can be dispersed in both polar and non-polar solvents and hence can be applied extensively in the electroless plating process used in the fabrication of electronic circuits as well as many catalytic reaction using catalysts such as platinum, palladium and the like.

2. Description of the Related Prior Art

In past decades, compared with conventional metal microparticles, metal nanoparticles exhibit excellent qualities such as increased surface-to-volume ratio, elevated surface energy, increased ductility after pressure loading, higher hardness, larger specific heat and the like (C. Suryanarayana, F. H. Froes, Metallugial Transactions A 1992, 23, 1071). Therefore, the applicability of metal nanoparticles receive extensively interest by the material-directed industry and science. For example, catalysts based primarily on a variety of metal nanoparticle are increasingly used in various catalytic reactions among which an advantage of high conversion on the catalytic reaction of unsaturated hydrocarbon is noted especially (L. N. Lewis, Chem. Rev. 1993, 93, 2693).

It is known that different particle size of the nanoparticle could result in different electronic energy band configuration, a size-dependent property, which in turn might have effects on the physical and chemical properties thereof. This property is very important for their industrial application such as, for example, in the electroless nickel plating using platinum (Pt) as the catalyst, wherein different electroless plating rates might vary with the particle size, as shown in FIG. 1 (Hamilton, J. F.; Baetzold R. C., Science, 1979, 205, 1213). Accordingly, it is the current topic in the industry as how to provide a process for the preparation and particle size distribution controlling of metal nanoparticles having various particle sizes.

Processes currently used for preparing metal nanoparticle are classified generally into chemical synthetic method and physical synthetic method. The chemical reduction method is widely used due to its high production capacity, simple preparation process, and low cost. In general, chemical reduction method comprises of dissolving inorganic metal salts in a solution containing polymer or surfactant dissolved therein, and then reducing said inorganic metal salts into metal nanoparticles with added reducing agents such as hydrazide, $NaBH_4$, ethanol, hydrogen and the like.

The reducing agent added could have an effect on the particle size. An excess addition may result in a strong reducing power and hence too rapid the nucleation rate such that the resulting metal nanoparticles will be too large and have a non-uniform particle size distribution. On the contrary, too less addition of the reducing agent will lead frequently to a too low reducing rate such that the synthesis of the particle might take several days, and even may make the reduction of the inorganic metal salts impossible. Accordingly, the type and dose of the added reducing agent, as well as the mode of agitation are the critical parameters that increase the complexity of the production process.

U.S. Pat. No. 4,593,016 disclosed a process for preparing nanometer colloidal particles of tin-palladium alloy by dissolving palladium chloride and stannous chloride in HCl solution, respectively, mixing these two solutions and raising the temperature to 100° C. such that the stannous ion could reduce the palladium ion into tin-palladium alloy nanoparticle. U.S. Pat. No. 5,187,209 disclosed the synthesis of Pt nanoparticles of about 3 nm by dissolving 5 ml $1.1 \times 10^{-2}$ mol/l $Na_2PtCl_4$ in 50 ml of a mixture consisting of equal portions of water and ethanol and containing 1.1 g copolymer having hydrazide functional group, and irradiating the resulting solution with a 500 W high pressure mercury lamp for 2 hours to reduce Pt into Pt nanoparticles.

U.S. Pat. No. 5,147,841 disclosed the preparation of Pt or Pd nanoparticles having particle sizes of 10–20 nm by a process comprising dissolving $Na_cPtCl_4$ or $NaPdCl_6$ in a n-octane solution of a cationic surfactant, didodecyldimethyl-ammonium bromide (DDAB), and adding $NaBH_4$ or hydrazide to reduce the $Pt^{2+}$ or $Pd^{2+}$ ions in the solution.

U.S. Pat. No. 5,759,230 disclosed the synthesis of 10 nm Pd nanoparticles and 40 nm Ag nanoparticles by dissolving $PdCl_2$ or $AgNO_3$ in ethanol used also as the reducing agent and heating at 120–200° C. under reflux for 1–3 hours.

U.S. Pat. No. 5,332,646 disclosed a process comprising reducing metallo-organic salt of Pd and Pt that have been dissolved in a solution of surfactant/organic solvent and hence synthesizing an effectively dispersed Pd and Pt metal nanoparticle of 2–50 nm.

U.S. Pat. No. 5,620,584 disclosed the synthesis of Pd nanoparticles having various particle sizes by using 90 ml 0.1 M tetraoctylammonium bromide solution in THF as the electrolytic solution and tow pieces of palladium sheet as the cathode and anode, and synthesizing Pt nanoparticles with varying electric current density via an electrochemical reaction as oxidation of ions by the anode and reduction by the cathode.

U.S. Pat. No. 6,103,868 disclosed a process for preparing gold nanoparticles by dissolving 150 mg $HAuCl_4.3H_2O$ in 25 ml de-ionized water into a yellow aqueous solution that was mixed with a solution of 0.365 g $N(C_8H_{17})_4Br/25$ ml toluene under intensively stirring, while adding 0.151 g $NaBH_4$ to yield reduced gold nanoparticles.

In summary, as used in conventional techniques, surfactants have been used as the protective agent for particles due to the fact that the surfactant dissolved in a solvent can form micelle. Further, if the metal nanoparticles were synthesized in an aqueous solution containing an aqueous phase surfactant, since a surfactant has a feature that a surfactant molecule in an aqueous solution will have its hydrophilic group face outwardly, and its lipophilic group face inwardly, the particles can be re-dispersed only by the aqueous phase, while the particles will be un-stable in the organic solvent such that it will render the precipitate not effectively dispersed. Likewise, in case of synthesizing metal nanoparticles in an organic solvent, due to the fact that the surfactant molecule will form a structure of reverse micelle in an organic solvent where its lipophilic group will face outwardly while its hydrophilic group inwardly, they can be dispersed stably only in an organic solvent.

Accordingly, there is a need in the art to provide a process for preparing metal nanoparticles that can be dispersed in both polar solvent and non-polar solvent.

SUMMARY OF THE INVENTION

The main object of the invention is to provide a process for preparing noble metal nanoparticles, characterized in that it comprises uses surfactant containing carboxylic group (COO⁻), sulfate group ($SO_4^{2-}$) or sulfonate group ($SO_3^{2-}$) to play the role of reducing agent, and that synthesis of metal nanoparticles having different particle size can be controlled by adjusting the carbon chain length of the surfactant or the synthesizing time.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
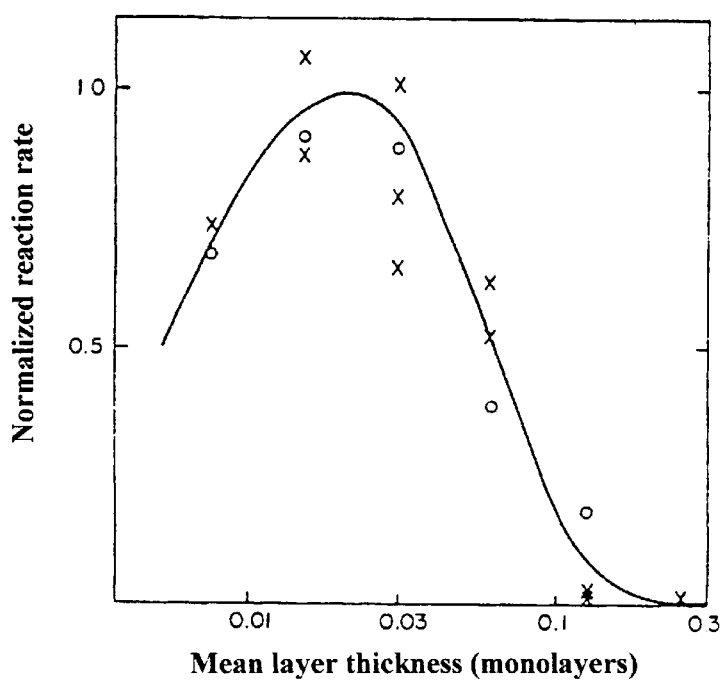
FIG. 1 is a diagram showing the correlation of electroless plating rate vs. the particle size of Pt nanoparticle powder catalyst (Hamilton J. F., 1979)

As described above, the invention provides a process for preparing metal nanoparticles by using anionic surfactant and suitable metal salts in the absence of added reducing agent, such that under the reducing power of said anionic surfactant itself, the metal salts can be effectively reduced into metal nanoparticles having a uniform particle size.

Suitable metal salts useful in the process according to the invention can be any of noble metal salts conventionally used. Preferably, suitable noble metal salts are for example, $Pd(OAc)_2$, $PdCl_2N$, $H_2PtCl_6 \cdot H_2O$, $Ag(OAc)_2$, $Ag(NO)_3$, or $HAuCl_4 \cdot 3H_2O$.

Suitable anionic surfactants useful in the process according to the invention are those containing an anionic group for example, carboxylic group (COO_), sulfate group ($SO_4^{2-}$) or sulfonate group ($SO_3^{2-}$) and being able to act as well a reducing agent for reducing metal salts into elemental metal nanoparticles. Examples of such anionic surfactant are sodium n-tetradecyl sulfate, sodium dodecy sulfate, sodium decyl sulfate, and sodium n-nonyl sulfate or sodium n-octyl sulfate.

The reducing reaction of metal salts by the anionic surfactant can be carried out under reflux, for example, at a temperature of 50–140° C. During such reaction, by adjusting the carbon chain length of the surfactant or the synthesizing time, uniform metal nanoparticles having different particle size can be produced. The nanoparticles thus prepared can be dispersed in both polar solvent such as aqueous solvent for example water, and non-polar solvent such as hydrocarbon for example n-hexane, toluene, chloroform and the like and hence can be applied extensively in the electroless plating process used in the fabrication of electronic circuits as well as many catalytic reaction using catalysts such as platinum, palladium and the like.

The process for preparing metal nanoparticles according to the invention exhibits several following advantages:

1. By using surfactant as reducing agent directly, the complexity of the formulation can be reduced and the control be simplified.
2. The process according to the invention is not limited by the size of the reactor and hence can be suitably applied for the large scale mass production.
3. The process is useful for the preparation of metal nanoparticles of various elements.
4. Raw materials useful in the process according to the invention are simple and readily available and the synthetic process is simple, and hence the cost is low.
5. The synthesis of metal nanoparticles having different particle size can be controlled by vary the carbon chain length of the surfactant.
6. The product thus prepared can be effectively and long-lastingly dispersed in polar and non-polar solvents with good stability.

The metal nanoparticles prepared according to the process of the invention can be characterized by using a transmission electron microscope (TEM), an energy dispersion spectra (EDX) or UV-Visible spectroscopy for the particle size and elemental composition.

As compared with the noble metal nanoparticles prepared by conventional techniques such as those described in prior references, the metal nanoparticles synthesized by the process of the invention exhibit a more uniform particle size. Moreover, the raw material is simple and hence is suitable for the large scale mass production in the industry.

The invention will be illustrated in more detailed by way of the following non-limiting examples.

EXAMPLE 1

Figure 2:
FIG. 2 is the TEM micrograph of Pd nanoparticles/SDS (magnification: $3 \times 10^5$, 0.5 cm in the micrograph represent 20 nm)
Figure 3:
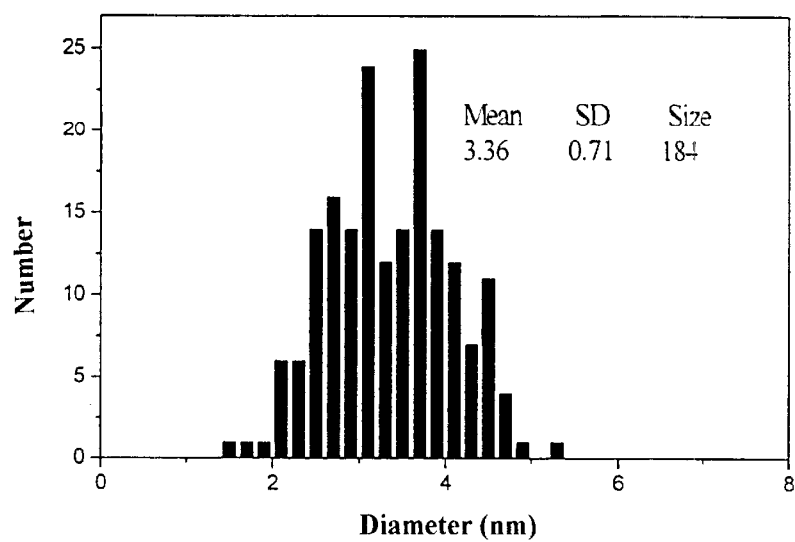
FIG. 3 is a statistical particle size distribution diagram of Pd nanoparticles/SDS.

0.052 g palladium acetate [$Pd(OAc)_2$] that is hardly soluble in water was dissolved in 100 ml 0.1 M aqueous sodium dodecyl sulfate (SDS) solution without adding any reducing agent, and was heated at reflux in a oil both at a temperature of 110–120° C. for 6 hours. After about 1 hour, the reaction solution turned into a clear orange-yellow color, and the color became brown as the reaction proceeded, which finally became dark brown after reacting for 3 hours. At the end of the reaction, the reaction mixture was centrifuged at 15000 rpm for 20 minutes into a supernatant phase and a precipitate (ppt). The supernatant appeared as a clear and transparent colorless aqueous solution. Since aqueous $Pd(OAc)_2$ solution should be yellow and further, the yield is 98% as determined by atomic absorption spectroscopy, it is indicated that the yield of the process according to the invention is extremely high. The result of TEM on the reaction solution shows Pd nanoparticles with uniform particle size, as shown in FIG. 2. The average particle size of Pd nanoparticles synthesized by using SDS surfactant is 3.36 nm, as shown in FIG. 3. The result in FIG. 3 indicated that the particle size of Pd nanoparticles thus synthesized is relatively consistent. Its chemical constituent is pure Pd as identified by EDX using X-ray excited through bombarding on the nanoparticles with electron bean. Furthermore, when SDS reaction proceeded for about half time, i.e., about 3 hours, TEM on the sample token then out of the reaction solution indicated Pd nanoparticles having a uniform average particle size only of 1.6 nm.

EXAMPLE 2

The same procedure as in Example 1 was repeated except the 0.052 g $Pd(OAc)_2$ was replaced with 0.1 g $H_2PtCl_6 \cdot H_2O$. A dark brown solution of Pt nanoparticle was synthesized.

EXAMPLE 3

Figure 4:
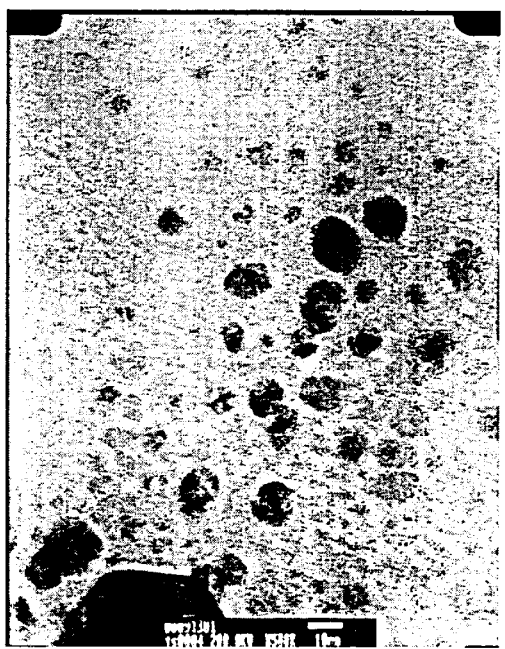
FIG. 4 is the TEM micrograph of Ag nanoparticles/SOS (magnification: $4 \times 10^5$, 0.5 cm in the micrograph represent 10 nm)

1.2 g silver acetate Ag(OAc) was dissolved in 50 ml 0.1 M aqueous sodium n-octane sulfate (SOS) solution and heated under reflux in a oil bath at a temperature of 120° C. for a period of 18 hours. As the Ag(OAc) was dissolved in the aqueous SOS solution, the resulting reaction solution is clear and colorless, however, as the reaction proceeded, it became gradually into bright yellow. The UV-Vis spectrum of the reaction solution revealed an absorption band at about 418 nm that is the characteristic absorption band of the silver nanoparticle. TEM result of the reaction solution, as shown in FIG. 4, shows a uniform Ag nanoparticle. Its chemical constituent is pure Ag as identified by EDX using X-ray excited through bombarding on the nanoparticles with electron bean.

EXAMPLE 4

The same procedure as in Example 3 was repeated except the 1.1 g silver acetate was replaced with 500 mg tetrachloroauric acid $HAuCl_4.3H_2O$. A deep red gold nanoparticle was synthesized.

EXAMPLE 5

This example examines effect of inorganic metal salts of varying concentrations on the reaction rate and the particle size of the metal nanoparticles. The reaction as described above was carried out at various concentrations of the inorganic metal salts while the type and concentration of surfactant was constant, and the temperature of the reflux reaction was controlled at 110° C., as indicated in Table 1.

TABLE 1

Effects of different concentration of inorganic salts on the synthetic reaction rate and the particle size of the metal nanoparticles

| Group | Conc'n of $Pd(OAc)_2$ | Conc'n of SDS (100 ml) | Time as solution turns into dark brown | Characteristics of Pd nanoparticles |
| --- | --- | --- | --- | --- |
| 1 | 0.02 g | 0.1 M | 2 hr 48 min | Uniform, average particle size of about 3.51 nm |
| 2 | 0.052 g | 0.1 M | 3 hr | Uniform, average particle size of about 3.36 nm |
| 3 | 0.84 g | 0.1 M | 2 hr 10 min | 90% uniform small particle of about 4 nm and 10% large particle of 15–30 nm |
| 4 | 1.02 g | 0.1 M | 3 hr | 90% uniform small particle of about 4 nm and 10% large particle of 15–30 nm |

Results of UV-Vis spectra and TEM revealed that, no matter how the concentration of $Pd(OAc)_2$ was low to 0.02 g/100 ml or high as 1.02 g/100 ml, the nanoparticle could be synthesized equally and no great effect on its reaction rate was observed. Since Pd2+ was reduced by the surfactant in the system under a reaction condition milder than that by an added reducing agent, no great effect of varying the concentration of $Pd(OAc)_2$ on the particle size was observed. As the concentration increased largely, the concentration of the resulting particle was increased correspondingly, though part of small particle tended to aggregate into large particle.

EXAMPLE 6

This example examines effects of the carbon chain length of the lipophilic group in the surfactant on the synthetic reaction rate and on the particle size of the metal ananoparticle. Therefore, surfactants each having a lipophilic group of different carbon chain length and constant concentrations of inorganic metal salts and surfactant were used in the reduction reaction as described above.

TABLE 2 effects of the carbon chain length of the lipophilic group in the surfactant on the synthetic reaction rate and on the particle size of Pd nanoparticle.

| Group | Surfactant | Average particle size d (nm) | Time as solution turn into dark brown | Reflux temp. (° C.) |
| --- | --- | --- | --- | --- |
| 1 | Na n-octane sulfate | 9.41 | 30 min. | 70 |
| 2 | Na decyl sulfate | 6.44 | 30 min. | 70 |
| 3 | Na dodecyl sulfate | 3.36 | 4 hr | 120 |
| 4 | Na tetradecyl sulfate | 3.25 | 5 hr | 120 |

Results revealed that variation of he carbon chain length of the lipophilic group in the surfactant could have a significant effect on its reducing power on the inorganic metal salts and this feature can be used to synthesize metal nanoparticles of different particle size. Further, TEM result suggested that, as the he carbon chain length of the lipophilic group in the surfactant was increased, the particle size became less. Accordingly, the process can be used for preparing metal nanoparticles having different particle sizes.

EXAMPLE 7

Esumi et al. had pointed out that, by dissolveing $Pd(OAc)_2$ in an organic solvent and heating at 110–116° C. to undergo decomposition, Pd nanoparticles could be formed (K. Esumi, T. Tano, K. Meguro, Langmuir 1989, 5, 268). In order to clarify whether Pd nanoparticles formed by using $Pd(OAc)_2$ in a series of aqueous SDS solution comes from decomposition of $Pd(OAc)_2$ or chemical reduction, following control experiments were carried out:

1. 0.052 g $Pd(OAc)_2$+1.16 g sodium n-octane sulfate (SOS)/50 ml $H_2O$, temperature of oil bath: 70° C. time: 4 hr.
2. 0.052 g $Pd(OAc)_2$+50 ml $H_2O$, temperature of oil bath: 120° C. time: 4 hr.

In the first experiment that incorporated SOS surfactant, the solution turned from yellow into yellowish-brown within 30 minutes, and became dark brown at 30 minute when the spectra of Pd nanoparticle appeared.

In the second experiment that involved no SOS surfactant, the solubility of $Pd(OAc)_2$ in water was poor and could be dissolved partially only. After heating in oil bath at 120° C. for 4 hours, $Pd(OAc)_2$ was still not dissolved completely in the water. Therefore, it is clear from these two experiments that the nanoparticles synthesized according to the process of the present invention is not derived from the decomposition of $Pd(OAc)_2$ under heat but from the reduction of the inorganic metal salt by the surfactant.

EXAMPLE 8

The Pd nanoparticles as synthesized in Example 1 were re-dispersed in water, chloroform ($CHCl_3$) and n-hexane. From long-term observation, it was found that the metal nanoparticles synthesized by the process of the invention can be dispersed effectively and long-lastingly in polar solvents such as water, as well as in non-polar solvent such as chloroform, n-hexane and the like. This feature suggests that the nanoparticles thus synthesized can be applied for a variety of industry, for example, in the reaction of unsaturated hydrocarbons catalyzed by Pd and Pt catalysts, as the additive in the electrode of a cell, and the like; whereas as an aqueous solution, it is useful as the catalyst in the chemical plating of electric circuit.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A process for preparing metal nanoparticles, comprising reacting at least one noble metal salt and an anionic surfactant containing an anionic group selected from the group consisting of, carboxylic group (CO), sulfate group ($SO_4^{2-}$) and sulfonate group ($SO_3^{2-}$) as reducing agent in water under reflux at a temperature of 50–140° C., such that under the reducing power of said anionic surfactant itself, the metal salt is effectively reduced into metal nanoparticles having a uniform particle size, and the nanoparticle thus prepared is capable of being dispersed stably in polar and non-polar solvents.

2. A process as claimed in claim 1, wherein said surfactant is selected from the group consisting of sodium n-tetradecyl sulfate, sodium dodecyl sulfate, sodium decyl sulfate, sodium n-nonyl sulfate and sodium n-octyl sulfate.

3. A process as claimed in claim 2, wherein said noble metal salts are selected from the group consisting of $Pd(OAc)_2$, $PdCl_2N$, $H_2PtCl_6 \cdot H_2O$, $Ag(OAc)_2$, $Ag(NO)_3$, and $HAuCl_4 \cdot 3H_2O$.

4. A process as claimed in claim 3, wherein said noble metal salt is $Pd(OAc)_2$.

5. A process as claimed in claim 3, wherein said noble metal salt is $PdCl_2N$.

6. A process as claimed in claim 3, wherein said noble metal salt is $H_2PtCl_6 \cdot H_2O$.

7. A process as claimed in claim 3, wherein said noble metal salt is $Ag(OAc)_2$.

8. A process as claimed in claim 3, wherein said noble metal salt is $Ag(NO)_3$.

9. A process as claimed in claim 3, wherein said noble metal salt is $HAuCl_4 \cdot 3H_2O$.

10. A process as claimed in claim 2, wherein said surfactant is sodium n-tetradecyl sulfate.

11. A process as claimed in claim 2, wherein said surfactant is sodium dodecyl sulfate.

12. A process as claimed in claim 11 wherein the noble metal salt is $Pd(OAc)_2$.

13. A process as claimed in claim 2, wherein said surfactant is sodium decyl sulfate.

14. A process as claimed in claim 2, wherein said surfactant is sodium n-nonyl sulfate.

15. A process as claimed in claim 2, wherein said surfactant is sodium n-octyl sulfate.

16. A process as claimed in claim 1, wherein said noble metal salts are selected from the group consisting of $Pd(OAc)_2$, $PdCl_2N$, $H_2PtCl_6 \cdot H_2O$, $Ag(OAc)_2$, $Ag(NO)_3$, and $HAuCl_4 \cdot 3H_2O$.

* * * * *